Oct. 24, 1944. J. R. HOOVER 2,361,205
MASONRY STRUCTURE
Filed Jan. 30, 1942
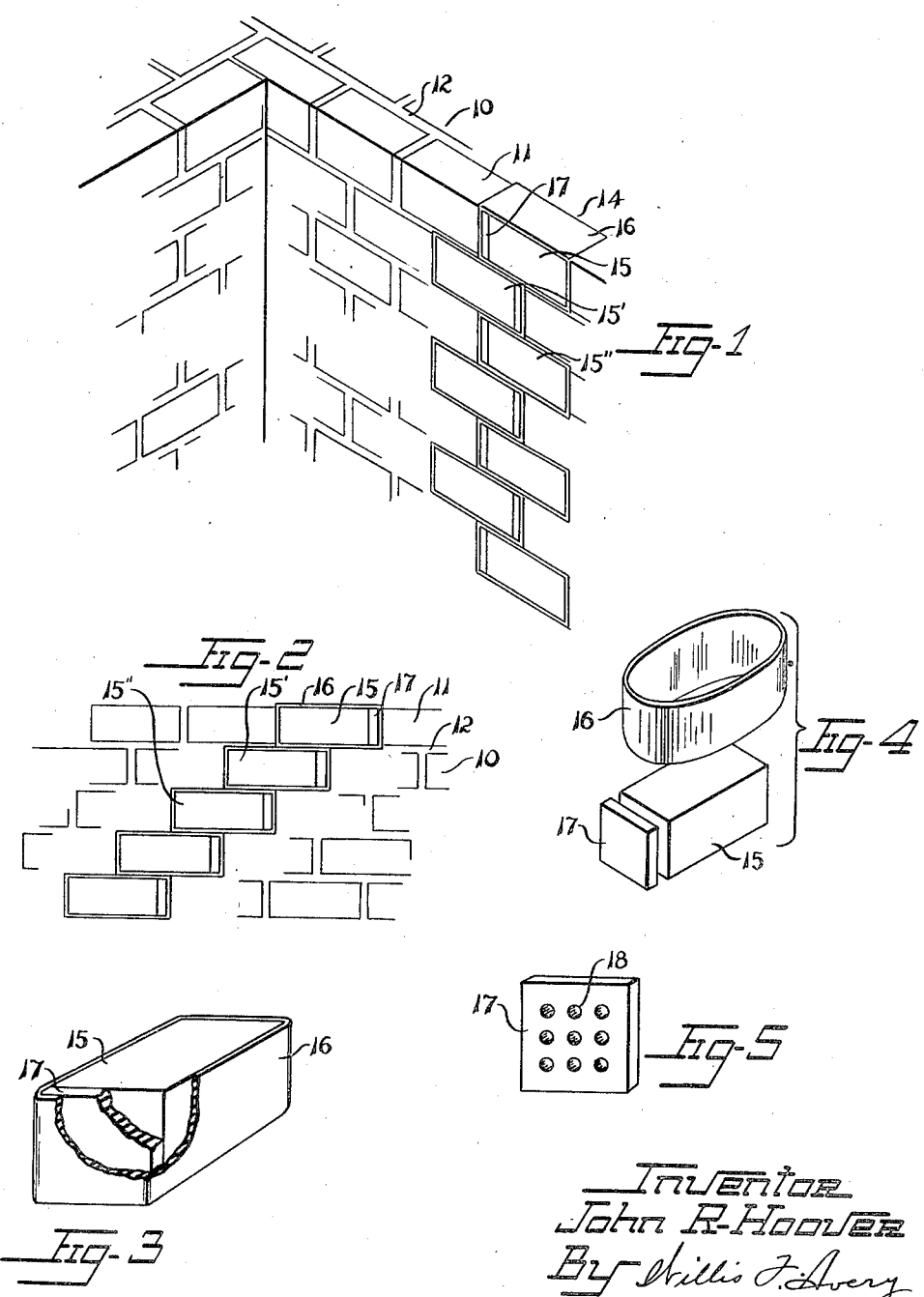

Patented Oct. 24, 1944

2,361,205

UNITED STATES PATENT OFFICE 2,361,205

MASONRY STRUCTURE

John R. Hoover, Stow, Ohio, assignor to The B. F. Goodrich Company, New York, N. Y., a corporation of New York Application January 30, 1942, Serial No. 428,885

5 Claims. (Cl. 72—106)

This invention relates to units and joints for masonry structures and is especially useful in the lining of tanks or floors to resist chemical action.

For protecting the walls and floors of tanks or other structures from corrosion by chemicals contained therein or coming in contact therewith, it has been customary to line such walls and floors with corrosion-resistant materials such as rubber, rubber-like materials, thermoplastic materials or other suitable water-proof materials. Most of these materials, while resistant to corrosion at low temperatures, are less resistant thereto or subject to damage by higher temperatures. To provide against damage to such linings by heat and abrasion, it has been found convenient to provide a thick protective lining of abrasion-resistant brick or tile having low heat conductivity and high resistance to corrosion. Such linings of brick or tile, while protecting the rubber or other material from excessive heat and abrasion, usually have a higher coefficient of expansion than the walls which confine them, requiring use of corrosion-resistant expansion joints in the masonry structure to avoid damage to the tank or other surrounding walls.

This invention aims to overcome the foregoing and other difficulties and to provide an improved joint suitable for use in masonry structures and especially where expansion and contraction occur.

The principal objects of the invention are to provide a simple and effective joint unit, to provide for convenience of assembly, to facilitate construction, to provide flexibility of construction, to provide for use of standard masonry elements, and to provide effective cushioning.

These and other objects will appear from the following description and the accompanying drawing.

Of the drawing,

Fig. 1 is a perspective view of a portion of a brick wall showing a joint constructed in accordance with and embodying the invention.

Fig. 2 is a face view of a modified joint of the invention.

Fig. 3 is a perspective view of the joint unit, parts being taken away.

Fig. 4 is a perspective view showing the parts of the unit before assembly.

Fig. 5 is a perspective view of a cushion element therefor.

In accordance with the invention, a masonry structure is formed of individual elements each enclosed by a band of corrosion-resistant cushing material such as rubber with the bands of contiguous masonry elements together occupying the motor space normally allowed between masonry elements. An endless form of the band provides sealing throughout and greatly facilitates assembly. In one form of the invention, additional cushioning material may be enclosed by the band adjacent the masonry element over at least one face of the element, which increases the effectiveness for expansion and contraction.

Referring to the drawing, and first to Figs. 1 and 3 to 5, the numeral 10 designates a wall of masonary comprising parallel courses of masonry elements 11, such as brick or tile, laid in regular courses, so as to overlap or break joints. The masonry elements may be common brick or other material but where corrosive fluids are present, the elements are of corrosion-resistant material such as silica brick, block carbon, or the like and the mortar is of heat plastic sulphur composition, asphalt, or other heat plastic mortar material adapted to resist corrosion and to be rigid at the encountered temperatures. The invention may be applied to all the bricks if desired, or, as is shown in the illustrative embodiments, to a section of bricks only, the remaining bricks being held in place by mortar 12.

Extending through the wall 10 is an expansion joint 14 comprising a plurality of staggered rigid rectangular masonry elements 15, 15', 15'' similar to element 11 in dimensions and each having a band 16 of rubber composition or other corrosion-resistant deformable cushion material extending thereabout over four successive faces in one direction, and preferably equal in width to the faces of the masonry element which it surrounds. The thickness of the band, when in position, may be such as to provide one-half the thickness of a mortar joint so that where the bands about contiguous masonry elements contact with each other their sum will equal the thickness of the mortar joints and permit their masonry elements to be laid in regular courses with the mortar-laid elements of the course. When a water-tight construction is desired the bands of rubber-like material may be cemented to the masonry elements and to each other with rubber cement or other suitable adhesive, although relatively tight joints may be accomplished without the use of adhesive by mere compression of the rubber-like material due to the weight of the masonry elements.

The band may be endless and have a perimeter corresponding to that of the brick so as to fit the same. A slightly smaller perimeter of the band permits it to be snapped upon the brick and bear upon it under some tension, which facilitates correct positioning where the bricks are handled considerably after application of the band and prior to laying.

Where additional cushioning of the joint is desired, a pad 17 of deformable corrosion-resistant material corresponding in length and width to the dimensions of one face of the masonry element 15, preferably an end thereof, may be enclosed by the band 16 between the element and the band over such face. The pad 17 may be of cellular material, such as sponge rubber, or may be perforated, or cavitied as at 18, to increase its compressibility, and may be cemented to the masonry element and the band if desired.

In the embodiment of the invention shown in Fig. 1, the arrangement of the adjacent expansion joint elements is one of alternately staggered elements in successive courses vertically of the wall. In this figure, the joint is flanked by mortar-set elements having ends extending in intercalated relation with the elements of the expansion joints so that the sections of the wall adjacent the expansion section are keyed to each other.

In the embodiment of Fig. 2, the expansion joint elements are similar to those previously described, but are arranged in offset relation in one direction in successive courses of the wall. While the expansion joint has been described as employed in a wall structure, the same constructions may be used in a floor, ceiling, or other masonry structure.

The corrosion-resistant cushioning material of the bands and the cushion pads is preferably a soft vulcanized rubber composition although synthetic rubber-like materials and other plastic materials may be employed. The bands are preferably endless and may be assembled simply by stretching them over the masonry elements.

Variations may be made without departing from the scope of the invention as it is defined by the following claims.

I claim:

1. A masonry unit comprising a masonry element, a volumetrically compressible cushion pad on one face of said element, and a band of deformable cushioning material extending about said element and said pad in one direction.

2. A masonry unit comprising a masonry element, a volumetrically compressible cushion pad on one face of said element, and a band of deformable cushioning material extending about said element and said pad in one direction, said pad being of cellular construction.

3. A masonry unit comprising a masonry element, a volumetrically compressible cushion pad on one face of said element, and a band of deformable cushioning material extending about said element and said pad in one direction, said pad and said band being adhered to said element and to each other.

4. A masonry unit comprising a rigid rectangular masonry element, a cushion pad of sponge rubber on one face of said element substantially coextensive with the area thereof, and a band of deformable cushioning material extending about said element and said pad.

5. An expansion joint for a corrosion-resistant mortar-joined masonry structure, said joint comprising a plurality of corrosion-resistant bricks arranged successively as a continuing line of bricks extending through the structure in adjacent brick courses of the structure, each brick of said joint having a volumetrically compressible resilient block coextensive with one face of the brick and located at such face, and an elastic band of rubber-like material stretched about said brick and said block, said band being substantially coextensive in width with the faces of the brick and block assembly which it encloses and having a thickness at least equal to one-half the thickness of the mortar joints of the masonry structure when stretched in place, said band being mounted in such structure under compression between adjacent bricks to prevent leakage upon thermal contraction of said bricks from one another.

JOHN R. HOOVER.